US012652157B2

(12) United States Patent
Kim

(10) Patent No.: US 12,652,157 B2
(45) Date of Patent: Jun. 9, 2026

(54) APPARATUS AND METHOD WITH INTERSECTION OPERATION

(71) Applicants: SAMSUNG ELECTRONICS CO., LTD., Suwon-si (KR); IUCF-HYU (Industry-University Cooperation Foundation Hanyang University), Seoul (KR)

(72) Inventor: Miran Kim, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 60 days.

(21) Appl. No.: 18/594,361

(22) Filed: Mar. 4, 2024

(65) Prior Publication Data

US 2025/0106005 A1 Mar. 27, 2025

(30) Foreign Application Priority Data

Sep. 26, 2023 (KR) ........................ 10-2023-0129367

(51) Int. Cl.
*H04L 9/06* (2006.01)
*H04L 9/00* (2022.01)

(52) U.S. Cl.
CPC ............ *H04L 9/0631* (2013.01); *H04L 9/008* (2013.01)

(58) Field of Classification Search
None
See application file for complete search history.

(56) References Cited

U.S. PATENT DOCUMENTS

| | | | | |
|---|---|---|---|---|
| 8,396,210 | B2 * | 3/2013 | Shibutani | H04L 9/0625 |
| | | | | 380/28 |
| 8,515,058 | B1 * | 8/2013 | Gentry | H04L 9/008 |
| | | | | 380/28 |
| 8,565,435 | B2 * | 10/2013 | Gentry | H04L 9/0816 |
| | | | | 713/171 |
| 10,382,194 | B1 * | 8/2019 | Miller | H04L 9/008 |
| 11,277,256 | B2 * | 3/2022 | Kim | H04L 9/008 |

(Continued)

FOREIGN PATENT DOCUMENTS

| | | |
|---|---|---|
| CN | 109886029 A | 6/2019 |
| KR | 10-2004-0093128 A | 11/2004 |

OTHER PUBLICATIONS

Chen, Hao, Kim Laine, and Peter Rindal. "Fast private set intersection from homomorphic encryption." *Proceedings of the 2017 ACM SIGSAC Conference on Computer and Communications Security.* 2017.

(Continued)

*Primary Examiner* — Backhean Tiv
(74) *Attorney, Agent, or Firm* — NSIP Law

(57) ABSTRACT

A processor-implemented method includes receiving, from a first device, ciphertext corresponding to elements of a first data set of the first device, performing, based on a match function defined for elements of a second data set of a second device, an intersection operation between the ciphertext and the elements of the second data set, and transmitting a result of the intersection operation to the first device, wherein the ciphertext is generated based on an elementary symmetric polynomial corresponding to the elements of the first data set.

20 Claims, 7 Drawing Sheets

(56) References Cited

U.S. PATENT DOCUMENTS

| | | | | |
|---|---|---|---|---|
| 11,347,477 | B2 | 5/2022 | Sumbul et al. | |
| 11,502,820 | B2* | 11/2022 | Ratha | H04L 9/065 |
| 12,231,531 | B2* | 2/2025 | Moon | H04L 9/0618 |
| 2002/0001383 | A1* | 1/2002 | Kasahara | H04L 9/3093 |
| | | | | 380/30 |
| 2008/0253557 | A1* | 10/2008 | Dottax | H04L 9/002 |
| | | | | 380/28 |
| 2013/0216044 | A1* | 8/2013 | Gentry | H04L 9/008 |
| | | | | 380/277 |
| 2013/0315390 | A1* | 11/2013 | Gentry | H04L 9/008 |
| | | | | 380/44 |
| 2015/0172258 | A1* | 6/2015 | Komano | H04L 9/008 |
| | | | | 380/259 |
| 2018/0367293 | A1* | 12/2018 | Chen | H04L 9/30 |
| 2019/0007196 | A1* | 1/2019 | Malluhi | H04L 9/008 |
| 2021/0194856 | A1 | 6/2021 | Laine et al. | |
| 2022/0113974 | A1 | 4/2022 | Omer et al. | |
| 2022/0414443 | A1 | 12/2022 | Li | |
| 2023/0005391 | A1* | 1/2023 | Sharma | G06F 21/62 |
| 2023/0076400 | A1* | 3/2023 | Hayasaka | G06F 7/523 |
| 2023/0146149 | A1* | 5/2023 | Moon | H04L 9/3073 |
| | | | | 380/28 |
| 2024/0135031 | A1* | 4/2024 | Healy | G06F 21/6245 |
| 2024/0163076 | A1* | 5/2024 | Lee | H04L 9/0618 |
| 2025/0106005 | A1* | 3/2025 | Kim | H04L 9/0631 |

OTHER PUBLICATIONS

Cong, Kelong, et al. "Labeled PSI from homomorphic encryption with reduced computation and communication." *Proceedings of the 2021 ACM SIGSAC Conference on Computer and Communications Security.* 2021.

* cited by examiner

100

Start

Receive ciphertext corresponding to elements of first data set ⟞~610

Perform intersection operation between ciphertext and elements of second data set based on match function defined for elements of second data set ⟞~620

Transmit result of intersection operation to first device ⟞~630

End

APPARATUS AND METHOD WITH INTERSECTION OPERATION

CROSS-REFERENCE TO RELATED APPLICATIONS

This application claims the benefit under 35 USC § 119 (a) of Korean Patent Application No. 10-2023-0129367, filed on Sep. 26, 2023 in the Korean Intellectual Property Office, the entire disclosure of which is incorporated herein by reference for all purposes.

BACKGROUND

1. Field

The following description relates to an apparatus and method with an intersection operation.

2. Description of Related Art

As privacy issues regarding user data become increasingly important, laws related to personal information protection, such as the General Data Protection Regulation (GDPR) of Europe, are emerging. However, data owners or collectors face many difficulties in providing or using services using related information without such privacy protection issues. For this reason, privacy protection technology for personal information protection may include private set intersection (PSI) technology which determines whether data matches in an encrypted state without revealing the data.

PSI technology is an example of multi-party computation (MPC), which finds an overlapping intersection (common elements) of two entities without revealing their respective sets. Existing methods include hash-based PSI, public key encryption-based PSI, circuit-based PSI, oblivious transfer (OT)-based PSI, and the like. In these existing technologies, however, as the number of objects of comparison increases, the amount of data transfer or computation between the two entities for an intersection operation significantly increases, and thus, a problem exists that an intersection operation for large data is impossible or that the operation speed is excessively slow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: receiving, from a first device, ciphertext corresponding to elements of a first data set of the first device; performing, based on a match function defined for elements of a second data set of a second device, an intersection operation between the ciphertext and the elements of the second data set; and transmitting a result of the intersection operation to the first device, wherein the ciphertext is generated based on an elementary symmetric polynomial corresponding to the elements of the first data set.

The performing of the intersection operation may include performing a linear combination operation of the ciphertext and a power of the elements of the second data set.

The performing of the intersection operation further may include performing an additional operation to obtain elements of the intersection based on a result of the linear combination operation and the elements of the second data set.

The transmitting of the intersection operation result may include transmitting the linear combination operation result and a result of the additional operation to the first device.

A number of the elements of the first data set may be less than a number of the elements of the second data set.

An accumulated number of homomorphic multiplication operations in the intersection operation may be "1."

The ciphertext may be ciphertext based on ring learning with errors (RLWE).

In one or more general aspects, a non-transitory computer-readable storage medium may store instructions that, when executed by one or more processors, configure the one or more processors to perform any one, any combination, or all of operations and methods described herein.

In one or more general aspects, a processor-implemented method includes: obtaining an elementary symmetric polynomial corresponding to elements of a first data set of a first device; defining a precomputation formula based on the elementary symmetric polynomial; generating ciphertext by encrypting the precomputation formula; and transmitting the ciphertext to a second device.

The method may include: receiving, from the second device, a result of an intersection operation of the ciphertext and a second data set of the second device; and decrypting the intersection operation result.

A number of the elements of the first data set may be less than a number of the elements of the second data set.

The method may include performing, based on a match function defined for elements of a second data set of the second device, an intersection operation between the ciphertext and the elements of the second data set.

In one or more general aspects, an apparatus includes: one or more processors configured to: receive, from a first device, ciphertext corresponding to elements of a first data set of the first device; perform, based on a match function defined for elements of a second data set of a second device, an intersection operation between the ciphertext and the elements of the second data set; and transmit a result of the intersection operation to the first device.

For the performing of the intersection operation, the one or more processors may be configured to perform a linear combination operation of the ciphertext and a power of the elements of the second data set.

For the performing of the intersection operation, the one or more processors may be configured to perform an additional operation to obtain elements of the intersection based on a result of the linear combination operation and the elements of the second data set.

For the transmitting of the intersection operation result, the one or more processors may be configured to transmit the linear combination operation result and a result of the additional operation to the first device.

A number of the elements of the first data set may be less than a number of the elements of the second data set.

An accumulated number of homomorphic multiplication operations in the intersection operation may be "1."

The ciphertext may be ciphertext based on ring learning with errors (RLWE).

In one or more general aspects, a device includes: one or more processors configured to: obtain an elementary symmetric polynomial corresponding to elements of a first data set of a first device; define a precomputation formula based on the elementary symmetric polynomial; generate ciphertext by encrypting the precomputation formula; and transmit the ciphertext to a second device.

The one or more processors may be configured to: receive, from the second device, a result of an intersection operation of the ciphertext and a second data set of the second device; and decrypt the intersection operation result.

Other features and aspects will be apparent from the following detailed description, the drawings, and the claims.

Figure 1:
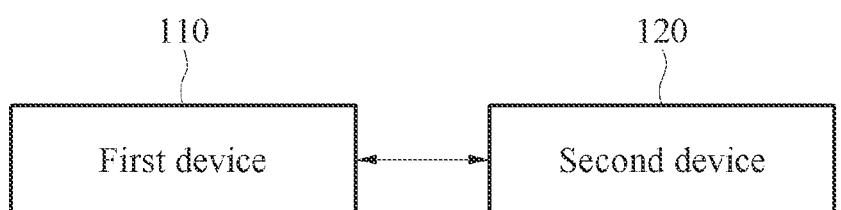
FIG. 1 illustrates an example of a configuration of an encryption system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical or scientific terms used herein have the same meaning as those commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the examples with reference to the accompanying drawings, like reference numerals refer to like components and a repeated description related thereto is omitted. In the description of examples, detailed description of well-known related structures or functions is omitted when it is deemed that such description may cause ambiguous interpretation of the present disclosure.

Although terms such as "first," "second," and "third," or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment (for example, as to what an example or embodiment may include or implement) means that at least one example or embodiment exists where such a feature is included or implemented, while all examples are not limited thereto.

The same name may be used to describe components having a common function in different examples. Unless otherwise mentioned, the description of one example may be applicable to another example. Thus, duplicated description is omitted for conciseness.

FIG. 1 illustrates an example of a configuration of an encryption system.

Referring to FIG. 1, an encryption system 100 may include a first device 110 and a second device 120. An apparatus and method of one or more embodiments may perform a private set intersection (PSI) operation having a low computational complexity.

The encryption system 100 may be a system for generating an intersection of data stored in the first device 110 and data stored in the second device 120 without revealing the data stored in the first device 110 and the second device 120.

For example, the encryption system 100 may provide a private set intersection (PSI) protocol, which allows one specific person of two parties to learn of an intersection of two sets held by the two parties without revealing information on elements of each of the two sets.

In addition, the encryption system 100 may provide a homomorphic encryption-based PSI protocol. Homomorphic encryption (HE) is a cryptographic technique that allows a computation to be performed on encrypted data without decryption. A result of various types of computations performed on homomorphically encrypted data may be the same as a result of the computations performed on the same data while the data is in an unencrypted state. Since homomorphic encryption can process data in an encrypted form, homomorphic encryption may be used to solve a privacy issue that may occur in a data industry.

For example, the first device 110 may have a first data set (e.g., Y), and the second device 120 may have a second data set (e.g., X). The size of the first data set Y and the size of the second data set X may be asymmetric. For example, the second device 120 may be a server (or a service provider) providing a big data-based PSI service, and the first device 110 may be a client terminal (or a service user) that is provided with the service. In this case, the number of elements of the first data set Y may be significantly less than the number of elements of the second data set X.

Before explaining the encryption system 100, the typical PSI protocol is briefly described below. To design a PSI protocol, a match function may be defined for elements $y \in Y$ of the set of service users as in Equation 1 below, for example.

$$\prod_{x \in X} (x - y) \qquad \text{Equation 1}$$

x may represent an element of the second data set X. Referring to Equation 1, when there exists x such that y=x, the match function has a value of 0. Otherwise, the match function has a non-zero value.

When Enc(·) is an encryption function, Equation 2 below, for example, may be obtained through a homomorphic encryption computation using encrypted information Enc(·).

$$\prod_{x \in X} (x - Enc(y)) \qquad \text{Equation 2}$$

When a determined circuit is to be calculated in an encrypted state, the depth of the circuit may be one of the most important factors that determines a ciphertext size and the amount of computation of homomorphic encryption. The depth of the circuit may represent an accumulated number of homomorphic multiplication operations. When the size of the set X of the service provider is |X|, since the highest degree of Enc(y) is |X|, the depth of the circuit is $O(\log_2 \log_2 |X|)$.

For example, when a typical encryption system performs intersection analysis on the set X having a relatively large size using the typical PSI protocol, a problem may be present that the depth of the circuit is deep and accordingly, the ciphertext is large and a large amount of computations is required.

In contrast to the typical encryption system, in the encryption system 100 of one or more embodiments as described in detail below, the first device 110 may precompute information on the first data set Y and transmit ciphertext generated by homomorphically encrypting a precomputation formula to the second device 120. The second device 120 may obtain an intersection of the encrypted data set Y and the second data set X using a match function. Here, the match function that is to be computed by the second device 120 in an encrypted state may be expressed as a linear combination of the ciphertext and the elements of the second data set X, and the depth of the circuit here may be "1." That is, the encryption system 100 of one or more embodiments may provide a method of processing an intersection operation of a homomorphically encrypted set having a low computational complexity.

Figure 2:
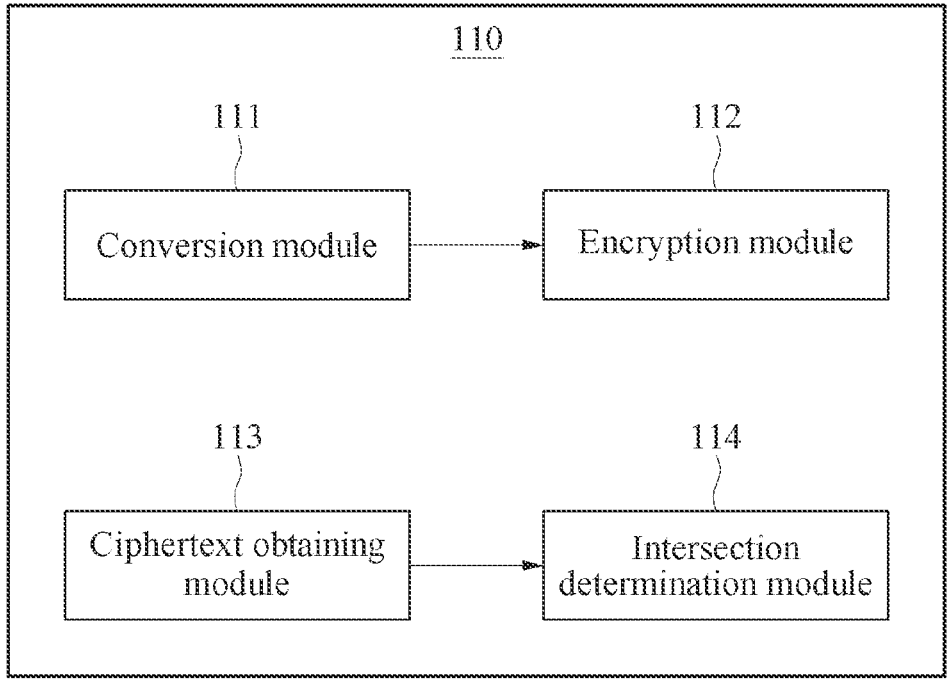
FIG. 2 illustrates an example of a configuration of a first device.

FIG. 2 illustrates an example of a configuration of a first device.

Referring to FIG. 2, the first device 110 may include a conversion module 111, an encryption module 112, a ciphertext obtaining module 113, and an intersection determination module 114.

The first device 110 may perform encryption and decryption using homomorphic encryption. Homomorphic encryption may refer to an encryption method configured to perform various computations on data while the data is in an encrypted state. A computation result of homomorphic encryption using ciphertexts may be new ciphertext, and a plaintext obtained by decrypting the ciphertext may be the same as a computation result of original data before encryption.

Hereinafter, encrypted data or cryptogram may be referred to as ciphertext. Ciphertext may take the form of a polynomial or a vector including a polynomial.

The first device 110 may perform an encryption process that encrypts input data in privacy preserving machine learning (PPML) and application services. The first device 110 may be used in an encryption process to encrypt an input value in PPML and application services.

The first device 110 may be implemented in the form of a chip and mounted on a hardware accelerator that utilizes homomorphic encryption. The first device 110 of one or more embodiments may be implemented in the form of a chip (e.g. a chip implementing software) and may reduce memory usage of various computing devices. The first device 110 of one or more embodiments may reduce the total amount of computation of a server by reducing the amount of computation of the homomorphic encryption computation. The first device 110 may be applied to any homomorphic encryption based on a ring learning with errors (RLWE) problem. The first device 110 may be implemented in an encryption process to encrypt an input value in any device and service that apply homomorphic encryption.

The first device 110 may be implemented as a personal computer (PC), a data server, and/or a portable device. The portable device may be implemented as a laptop computer, mobile phone, smartphone, tablet PC, mobile internet device (MID), personal digital assistant (PDA), enterprise digital assistant (EDA), digital still camera, digital video camera, portable multimedia player (PMP), personal (or portable) navigation device (PND), handheld game console, e-book, and/or smart device. The smart device may be implemented as a smart watch, smart band, and/or smart ring.

The conversion module 111 may obtain an elementary symmetric polynomial corresponding to the elements of the first data set Y. The conversion module 111 may obtain a k-th elementary symmetric polynomial $b_i$ corresponding to elements $y_1, y_2, \ldots, y_n$ of the first data set Y. The elementary symmetric polynomial $b_i$ may be defined as Equation 3 below, for example.

$$b_1 = \sum_{1 \le j \le n} y_j$$
$$b_2 = \sum_{1 \le j < k \le n} y_j y_k$$
$$b_3 = \sum_{1 \le j < k < i \le n} y_j y_k y_i$$
$$\vdots$$
$$b_n = y_1 y_2 \cdots y_n$$

Equation 3

The conversion module 111 may obtain a precomputation formula based on the elementary symmetric polynomial. A precomputation formula $a_i$ may be defined as Equation 4 below, for example.

$$a_i = \begin{cases} (-1)^{|Y|-i} b_{|Y|-i}, & i = 0, 1, \ldots, |Y|-1 \\ 1, & i = |Y| \end{cases}$$

Equation 4

The encryption module 112 may encrypt the precomputation formula to generate ciphertext and transmit the generated ciphertext for the precomputation formula to the second device 120.

The encryption module 112 may generate ciphertext for the precomputation formula using a homomorphic encryption algorithm. For example, the encryption module 112 may generate the ciphertext for the precomputation formula using an RLWE problem-based homomorphic encryption algorithm. The encryption module 112 may generate $Enc(a_i)$.

The ciphertext obtaining module 113 may receive ciphertext for elements corresponding to the intersection of the first data set Y and the second data set X from the second device 120.

The intersection determination module 114 may decrypt the ciphertext for the elements corresponding to the intersection to obtain the elements corresponding to the intersection.

Here, the intersection determination module 114 may decrypt the ciphertext using a decryption algorithm of encryption technology that is used by the encryption module 112 for encryption.

The term "module" in the conversion module 111, the encryption module 112, the ciphertext obtaining module 113, and the intersection determination module 114 may refer to a part that processes at least one function or operation and the unit may be implemented as hardware, e.g., hardware implementing software. For example, the conversion module 111, the encryption module 112, the ciphertext obtaining module 113, and the intersection determination module 114 of the first device 110 may be implemented as a processor.

The first device 110 may further include a memory. The processor may process data stored in the memory. The processor may execute computer-readable code (e.g., software) stored in the memory and instructions triggered by the processor.

The processor may be a hardware-implemented data processing device that has a circuit having a physical structure for executing desired operations. For example, the desired operations may include code or instructions included in a program.

For example, the hardware-implemented data processing device may include, for example, a microprocessor, a central processing unit (CPU), a processor core, a multi-core processor, a multiprocessor, an application-specific integrated circuit (ASIC), and/or a field programmable gate array (FPGA).

The memory may store instructions (or programs) executable by the processor. For example, the instructions may include instructions for performing an operation of the processor and/or an operation of each component of the processor.

The memory may be implemented as a volatile memory device or a non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EE-PROM), flash memory, magnetic RAM (MRAM), spin-transfer torque (STT)-MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, a molecular electronic memory device, or insulator resistance change memory.

Figure 3:
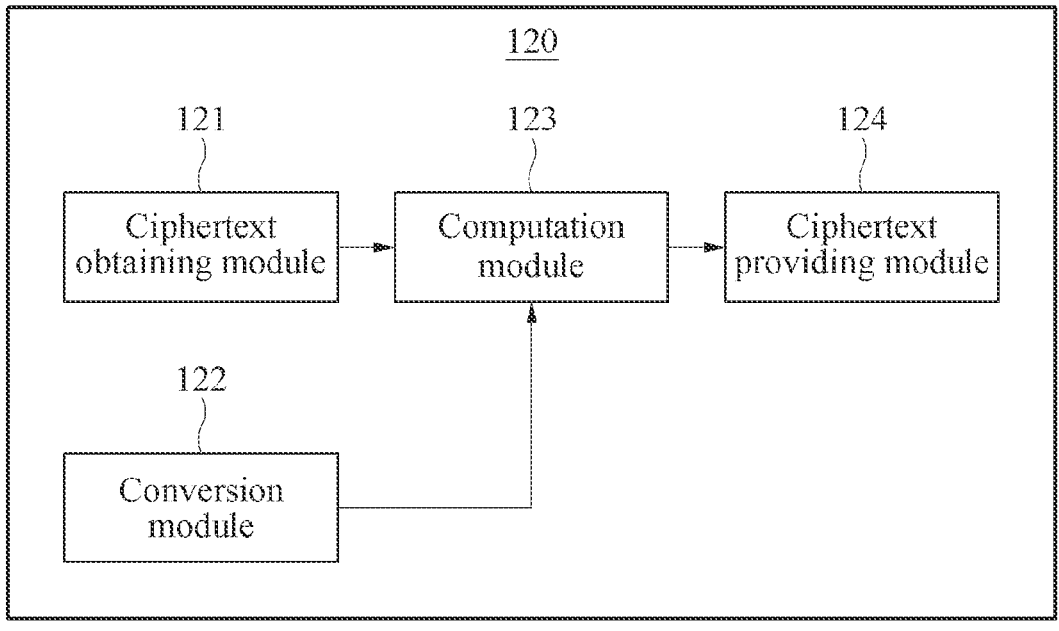
FIG. 3 illustrates an example of a configuration of a second device.

FIG. 3 illustrates an example of a configuration of a second device.

Referring to FIG. 3, the second device 120 may include a ciphertext obtaining module 121, a conversion module 122, a computation module 123, and a ciphertext providing module 124.

The ciphertext obtaining module 121 may receive, from the first device 110, ciphertext corresponding to the elements of the first data set Y of the first device 110. Here, the ciphertext obtained from the first device 110 may be generated in the same method described with reference to FIG. 2.

The second device 120 may define a match function for the elements $x \in X$ of the second data set X of the second device 120 as Equation 5 below, for example.

$$\prod_{y \in Y} (x - y)$$

Equation 5

The match function in Equation 5 may be expressed as Equation 6 below, for example, based on Equation 4.

$$\prod_{y \in Y} (x - y) = \sum_{i=0}^{|Y|} a_i x^i$$

Equation 6

When $Enc(\cdot)$ is an encryption function, the conversion module 122 may convert the match function as shown in Equation 7 below, for example, using the elementary symmetric polynomial.

$$F(x) = \prod_{y \in Y} (x - Enc(y)) = \sum_{i=0}^{|Y|} Enc(a_i) \cdot x^i$$

Equation 7

F(x) in Equation 7 may be referred to as a linear combination function or a match function.

The computation module 123 may perform an intersection operation between the ciphertext and the elements of the second data set X, based on Equation 7. The computation module 123 may perform the intersection operation through a linear combination operation of the ciphertext $Enc(a_i)$ and a power of the element $x^i$ of the second data set X.

In addition, the computation module 123 may perform an additional operation to obtain elements of an intersection of the ciphertext and the elements of the second data set X based on a result of the linear combination operation and the elements of the second data set X. For example, when the computation module 123 computes $G(x)=(F(x)+1)\cdot x$ in an encrypted state, when there exists y such that y=x, the function G(x) may have a value of x, and accordingly, the elements of the intersection may be obtained. G(x) may be referred to as a label function or an identity function.

The ciphertext providing module 124 may provide ciphertext generated by the computation module 123 to the first device 110. The ciphertext may include F(x) and G(x).

As the first device 110 precomputes information on the first data set Y and homomorphically encrypts the precomputation formula, the formula F(x) that needs to be computed by the second device 120 in an encrypted state may express a match function as a linear combination of $Enc(a_i)$ and $x^i$, and the depth of the circuit here may be "1."

Therefore, even in the case of an intersection analysis of the second data set X, which has a relatively large size, the encryption system 100 may have an advantage of having smaller ciphertext and requiring a small amount of computation compared to the typical PSI protocol since the depth of the circuit is shallow.

The term "module" in the ciphertext obtaining module 121, the conversion module 122, the computation module 123, and the ciphertext providing module 124 may refer to a part that processes at least one function or operation and the unit may be implemented as hardware, e.g., hardware implementing software. For example, the ciphertext obtaining module 121, the conversion module 122, the computation module 123, and the ciphertext providing module 124 may be implemented as a processor.

The processor may receive, from the first device 110, the ciphertext corresponding to the elements of the first data set Y of the first device 110, perform the intersection operation between the ciphertext and the elements of the second data set X based on a match function defined for the elements of the second data set X of the second device 120, and transmit a result of the intersection operation to the first device 110.

The processor may perform the linear combination operation of the ciphertext and the power of the elements of the second data set X.

The processor may perform the additional operation to obtain the elements of the intersection based on the result of the linear combination operation and the elements of the second data set X.

The processor may transmit the linear combination operation result and a result of the additional operation to the first device 110.

Figure 4:
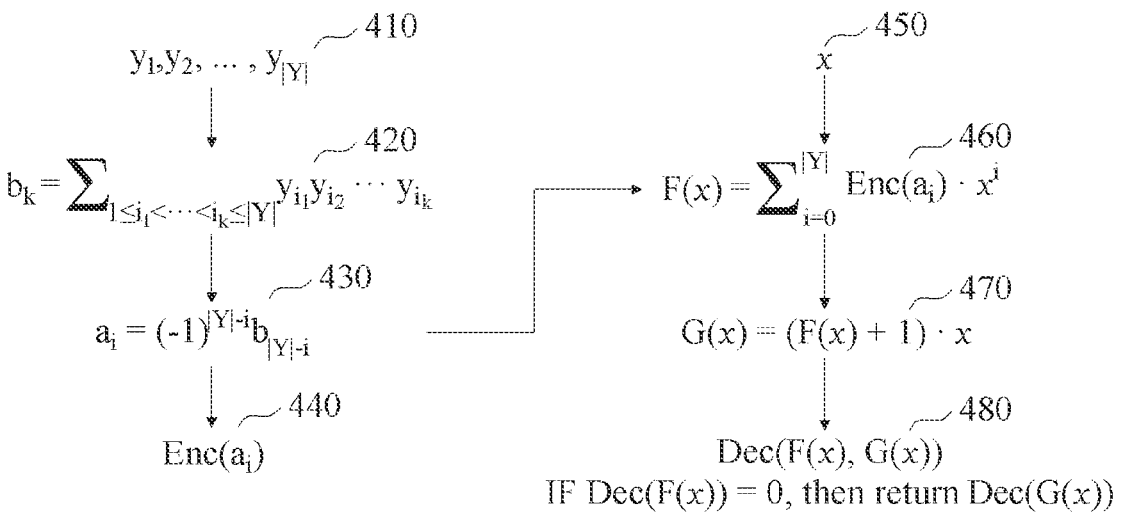
FIG. 4 illustrates an example of an operation of the first device and the second device constituting the encryption system.

FIG. 4 illustrates an example of an operation of the first device 110 and the second device 120 constituting the encryption system.

Referring to FIG. 4, the first device 110 may obtain a k-th elementary symmetric polynomial $b_k$ 420 with respect to elements $y_1, y_2, \ldots, y_{|y|}$ 410 of the first data set Y having a size of |Y| and define a precomputation formula $a_i$ 430 based on the k-th elementary symmetric polynomial $b_k$ 420.

The first device 110 may encrypt the precomputation formula to generate ciphertext $Enc(a_i)$ 440 and transmit the ciphertext $Enc(a_i)$ 440 to the second device 120.

The second device 120 may, on elements x 450 of the second data set X, perform a linear combination operation of the ciphertext $Enc(a_i)$ 440 and a power of the elements x 450 to obtain F(x) 460, and may also obtain a label function G(x) 470 through additional computation of the F(x) 460.

The second device 120 may transmit ciphertexts F(x) 460 and G(x) 470 to the first device 110, and the first device 110 may decrypt 480 the transmitted ciphertexts. For example, the first device 110 may output Dec(G(x)) when Dec(F(x)) is "0," and finally output elements corresponding to an intersection of the first data set Y and the second data set X.

Figure 5:
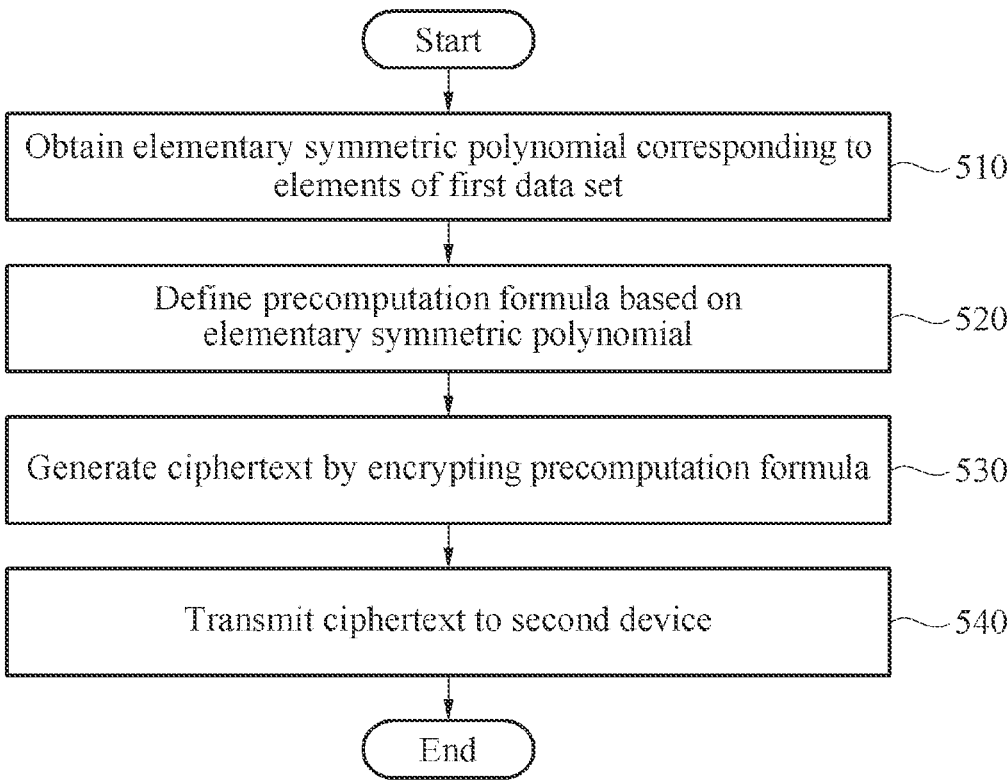
FIG. 5 illustrates a flowchart of an example of an operation of the first device.

FIG. 5 illustrates a flowchart of an example of an operation of the first device.

For ease of description, it will be described that operations 510 to 540 are performed using the first device 110 described with reference to FIGS. 1 to 4. However, the operations 510 to 540 may be performed by another suitable electronic device in a suitable system.

Furthermore, while the operations of FIG. 5 may be performed in the shown order and manner, the order of some operations may be changed, or some operations may be omitted, without departing from the spirit and scope of the shown example. The operations shown in FIG. 5 may be performed in parallel or simultaneously.

Referring to FIG. 5, the first device 110 may obtain an elementary symmetric polynomial corresponding to the elements of the first data set of the first device 110 in operation 510.

In operation 520, the first device 110 may define a precomputation formula based on the elementary symmetric polynomial.

In operation 530, the first device 110 may generate ciphertext by encrypting the precomputation formula.

In operation 540, the first device 110 may transmit the ciphertext to the second device 120.

The first device 110 may receive, from the second device 120, a result of an intersection operation of the ciphertext and the second data set of the second device 120 and decrypt the intersection operation result. The number of the elements of the first data set may be less than the number of the elements of the second data set.

Figure 6:
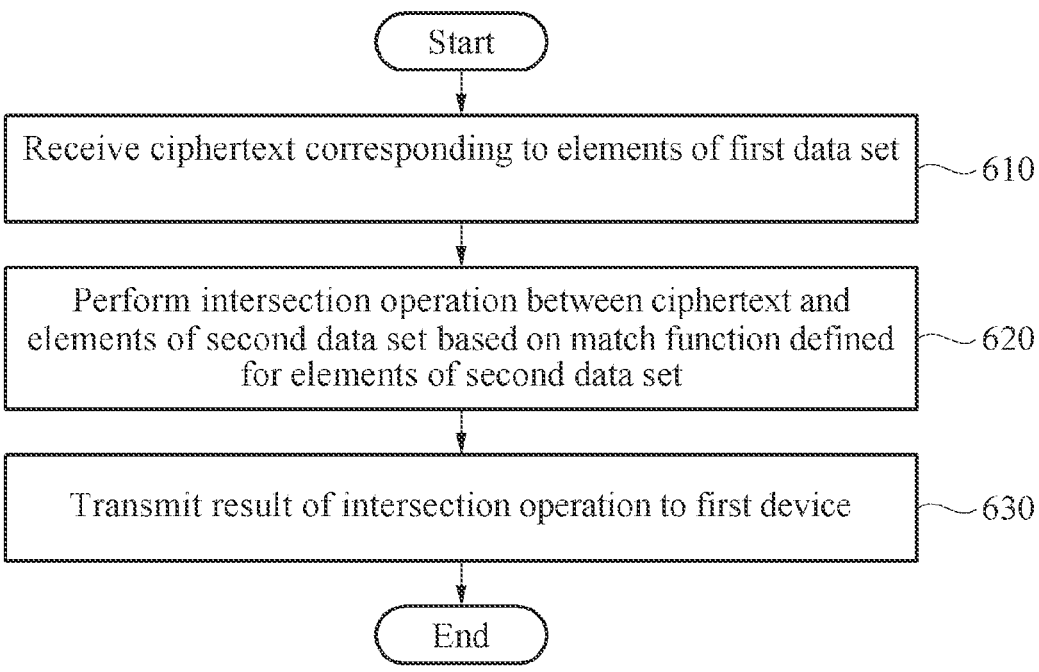
FIG. 6 illustrates a flowchart of an example of an operation of the second device.

FIG. 6 illustrates a flowchart of an example of an operation of the second device.

For ease of description, it will be described that operations 610 to 630 are performed using the second device 120 described with reference to FIGS. 1 to 5. However, the operations 610 to 630 may be performed by another suitable electronic device in a suitable system.

Furthermore, while the operations of FIG. 6 may be performed in the shown order and manner, the order of some operations may be changed, or some operations may be omitted without departing from the spirit and scope of the shown example. The operations shown in FIG. 6 may be performed in parallel or simultaneously.

Referring to FIG. 6, the second device 120 may receive, from the first device 110, ciphertext corresponding to the elements of the first data set of the first device 110 in operation 610. The ciphertext may be generated based on an elementary symmetric polynomial corresponding to the elements of the first data set.

In operation 620, the second device 120 may perform an intersection operation between the ciphertext and the elements of the second data set based on a match function defined for the elements of the second data set of the second device 120.

The second device 120 may perform a linear combination operation of the ciphertext and a power of the elements of the second data set. The second device 120 may perform an additional operation to obtain elements of an intersection of the ciphertext and the elements of the second data set based on a result of the linear combination operation and the elements of the second data set.

In operation 630, the second device 120 may transmit a result of the intersection operation to the first device 110. The second device 120 may transmit the linear combination operation result and a result of the additional operation to the first device 110.

The number of the elements of the first data set may be less than the number of the elements of the second data set. The accumulated number of homomorphic multiplication operations in the intersection operation may be "1."

Figure 7:
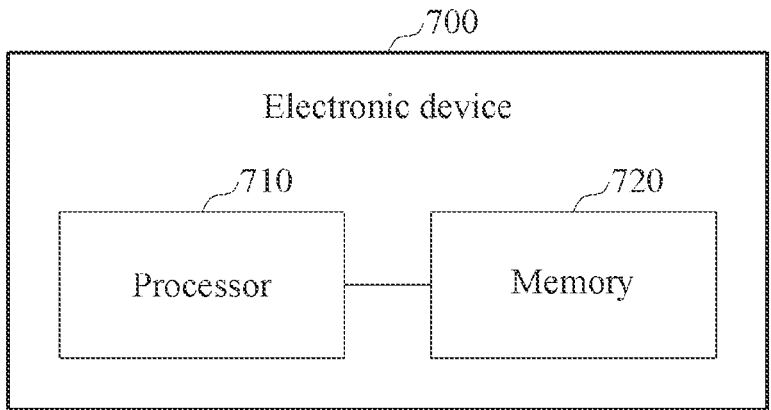
FIG. 7 illustrates an example of a configuration of an electronic device.

FIG. 7 illustrates an example of a configuration of an electronic device.

Referring to FIG. 7, an electronic device 700 may include a processor 710 (e.g., one or more processors) and a memory 720 (e.g., one or more memories). The memory 720 may be connected to the processor 710 and may store instructions executable by the processor 710, data to be operated by the processor 710, and/or data processed by the processor 710. The memory 720 may include a non-transitory computer readable medium, for example, a high-speed random-access memory (RAM), and/or a non-volatile computer readable storage medium (e.g., one or more disk storage devices, flash memory devices, and/or other non-volatile solid state memory devices). For example, the memory 720 may be or include a non-transitory computer-readable storage medium storing instructions that, when executed by the processor 710, configure the processor 710 to perform any one, any combination, or all of the operations and methods described herein with reference to FIGS. 1-6. The electronic device 700 may be implemented as at least one of a mobile device, such as a mobile phone, a smart phone, a personal digital assistant (PDA), a netbook, a tablet computer, and/or a laptop computer, a wearable device, such as a smart watch, a smart band, and/or smart glasses, a home appliance, such as a television (TV), a smart TV, and/or a refrigerator, a security device, such as a door lock, and/or a vehicle, such as an autonomous vehicle, and/or a smart vehicle.

The processor 710 may execute the instructions to perform the operations described with reference to FIGS. 1-6. The processor 710 may include any one or any combination of any two or more of the encryption system 100, the first device 110, the second device 120, the conversion module 111, the encryption module 112, the ciphertext obtaining module 113, the intersection determination module 114, the ciphertext obtaining module 121, the conversion module 122, the computation module 123, and the ciphertext providing module 124 described herein with respect to FIGS. 1-6.

In addition, the descriptions provided with reference to FIGS. 1-6 may apply to the electronic device 700.

The encryption systems, first devices, second devices, conversion modules, encryption modules, ciphertext obtaining modules, intersection determination modules, computation modules, ciphertext providing modules, electronic devices, processors, memories, encryption system 100, first device 110, second device 120, conversion module 111, encryption module 112, ciphertext obtaining module 113, intersection determination module 114, ciphertext obtaining module 121, conversion module 122, computation module 123, ciphertext providing module 124, electronic device 700, processor 710, memory 720, and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method comprising:
receiving, from a first device, ciphertext generated by encrypting a precomputation formula defined based on an elementary symmetric polynomial corresponding to elements of a first data set of the first device;
performing, based on a match function defined for elements of a second data set of a second device, an intersection operation between the ciphertext and the elements of the second data set; and
transmitting a result of the intersection operation to the first device.

2. The method of claim 1, wherein the performing of the intersection operation comprises performing a linear combination operation of the ciphertext and a power of the elements of the second data set.

3. The method of claim 2, wherein the performing of the intersection operation further comprises performing an additional operation to obtain elements of the intersection based on a result of the linear combination operation and the elements of the second data set.

4. The method of claim 3, wherein the transmitting of the intersection operation result comprises transmitting the linear combination operation result and a result of the additional operation to the first device.

5. The method of claim 1, wherein a number of the elements of the first data set is less than a number of the elements of the second data set.

6. The method of claim 1, wherein an accumulated number of homomorphic multiplication operations in the intersection operation is "1".

7. The method of claim 1, wherein the ciphertext is ciphertext based on ring learning with errors (RLWE).

8. A non-transitory computer-readable storage medium storing instructions that, when executed by one or more processors, configure the one or more processors to perform the method of claim 1.

9. A processor-implemented method comprising:
obtaining an elementary symmetric polynomial corresponding to elements of a first data set of a first device;
defining a precomputation formula based on the elementary symmetric polynomial;
generating ciphertext by encrypting the precomputation formula; and
transmitting the ciphertext to a second device.

10. The method of claim 9, further comprising:

receiving, from the second device, a result of an intersection operation of the ciphertext and a second data set of the second device; and decrypting the intersection operation result.

11. The method of claim 10, wherein a number of the elements of the first data set is less than a number of the elements of the second data set.

12. An apparatus comprising:

one or more processors configured to:

receive, from a first device, ciphertext generated by encrypting a precomputation formula defined based on an elementary symmetric polynomial corresponding to elements of a first data set of the first device;

perform, based on a match function defined for elements of a second data set of a second device, an intersection operation between the ciphertext and the elements of the second data set; and transmit a result of the intersection operation to the first device.

13. The apparatus of claim 12, wherein, for the performing of the intersection operation, the one or more processors are further configured to perform a linear combination operation of the ciphertext and a power of the elements of the second data set.

14. The apparatus of claim 13, wherein, for the performing of the intersection operation, the one or more processors are further configured to perform an additional operation to obtain elements of the intersection based on a result of the linear combination operation and the elements of the second data set.

15. The apparatus of claim 14, wherein, for the transmitting of the intersection operation result, the one or more processors are further configured to transmit the linear combination operation result and a result of the additional operation to the first device.

16. The apparatus of claim 12, wherein a number of the elements of the first data set is less than a number of the elements of the second data set.

17. The apparatus of claim 12, wherein an accumulated number of homomorphic multiplication operations in the intersection operation is "1".

18. The apparatus of claim 12, wherein the ciphertext is ciphertext based on ring learning with errors (RLWE).

19. A device comprising:

one or more processors configured to:

obtain an elementary symmetric polynomial corresponding to elements of a first data set of a first device;

define a precomputation formula based on the elementary symmetric polynomial;

generate ciphertext by encrypting the precomputation formula; and transmit the ciphertext to a second device.

20. The encryption device of claim 19, wherein the one or more processors are further configured to:

receive, from the second device, a result of an intersection operation of the ciphertext and a second data set of the second device; and decrypt the intersection operation result.

* * * * *